May 16, 1961 G. E. LAMB 2,984,364
ROLL-OVER MACHINE
Filed May 6, 1957 7 Sheets-Sheet 4

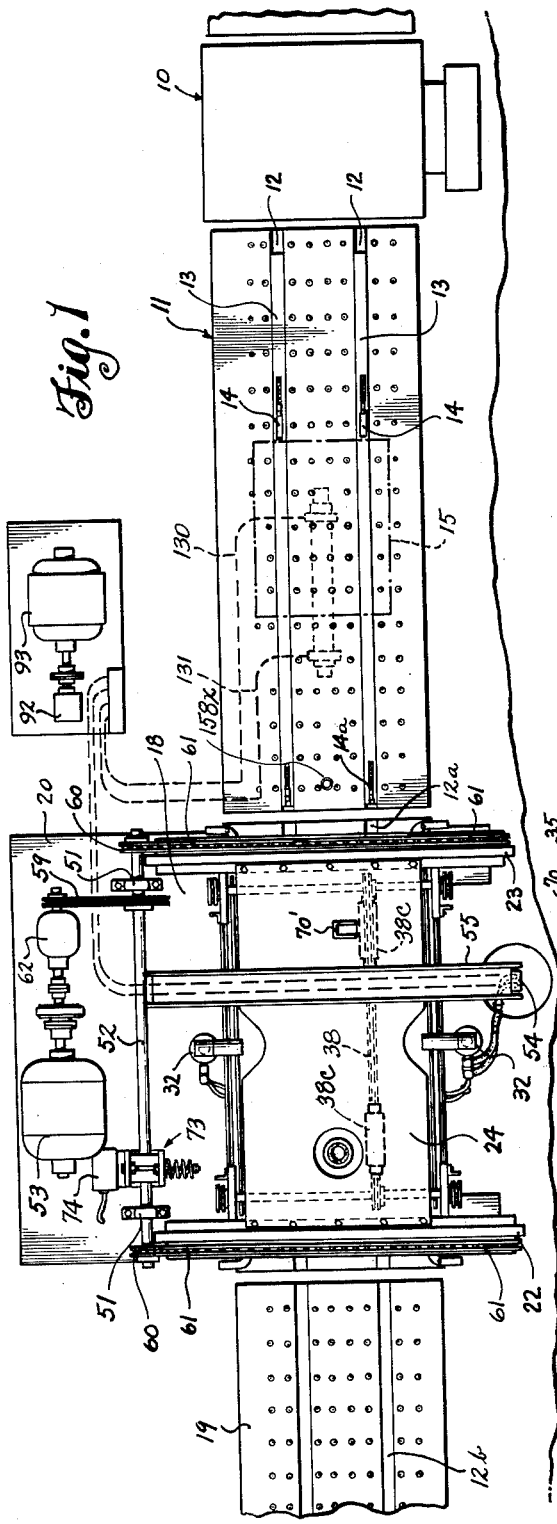
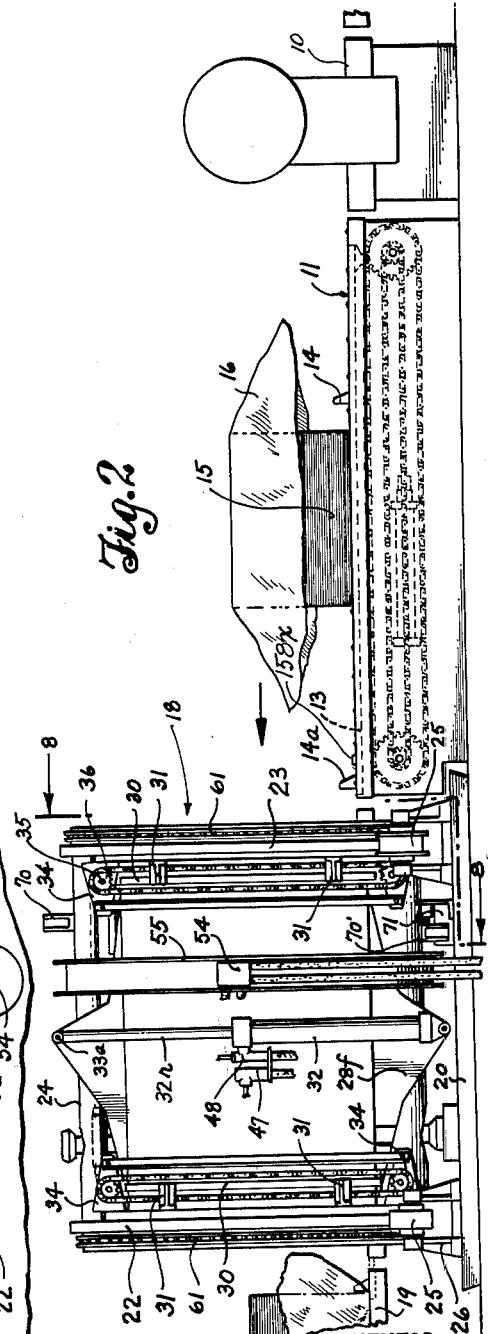

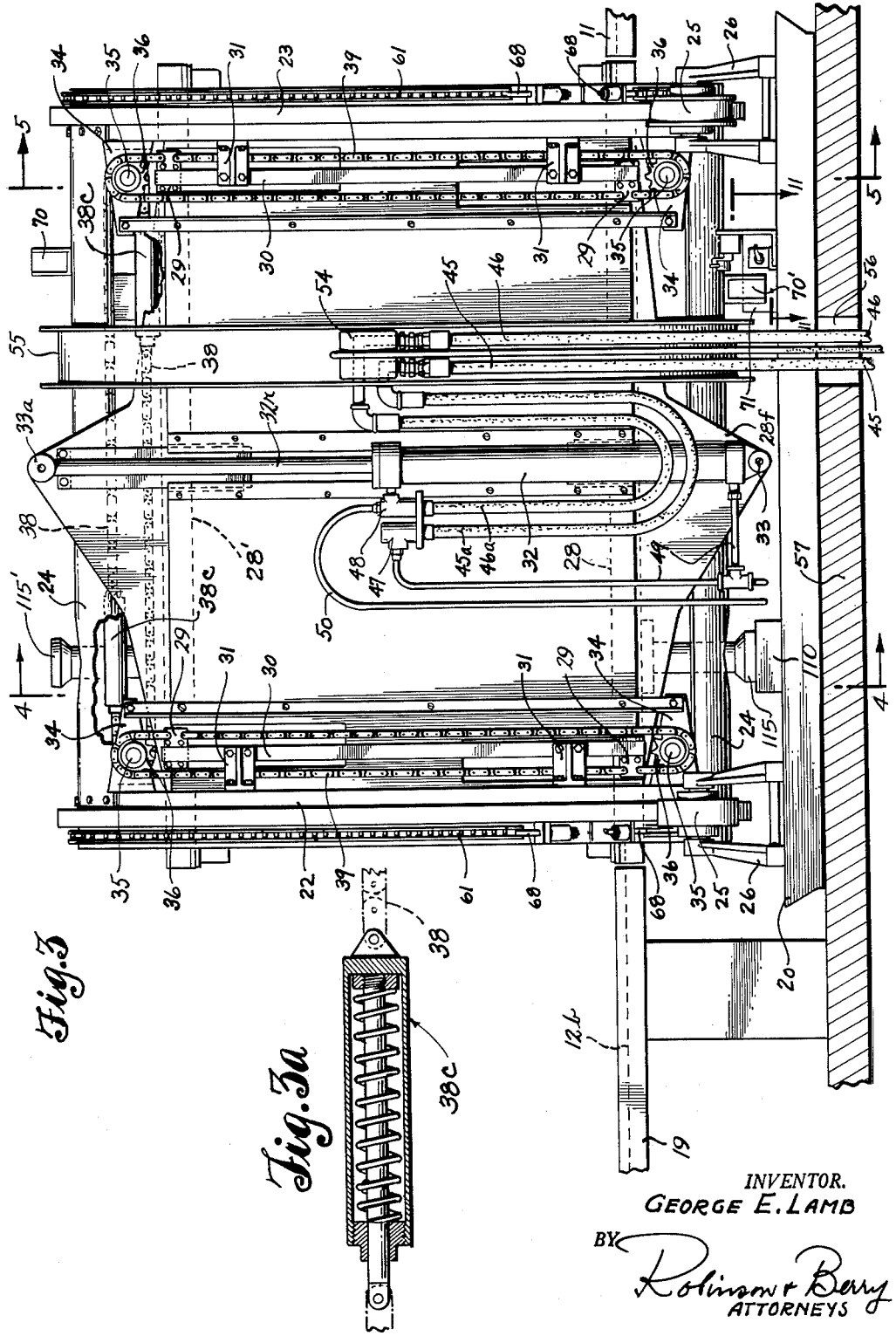

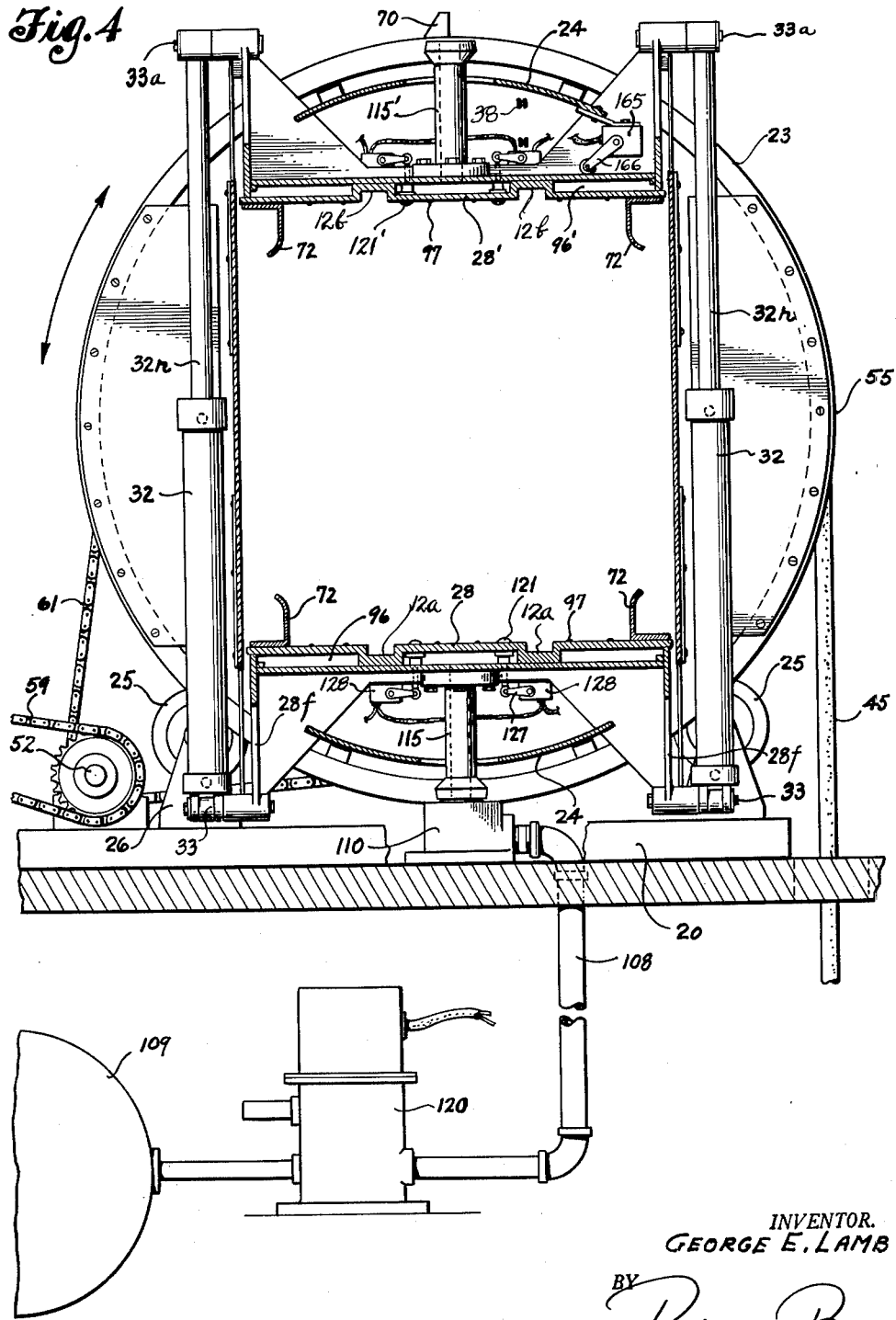

INVENTOR.
GEORGE E. LAMB
BY Robinson + Berry
ATTORNEYS

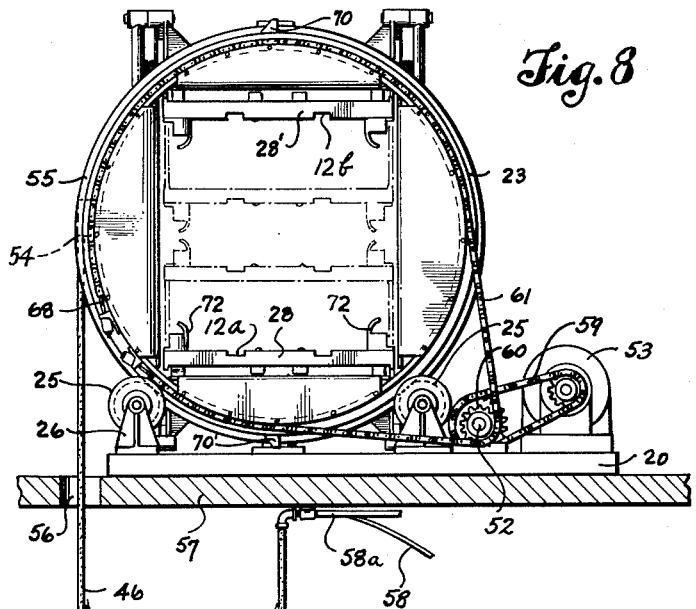
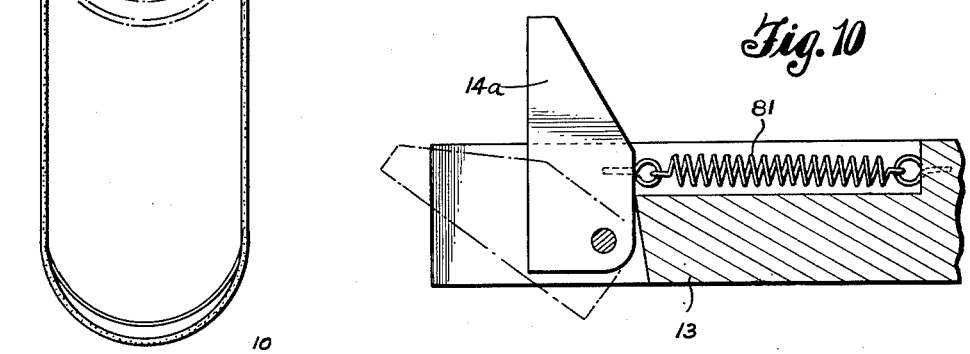
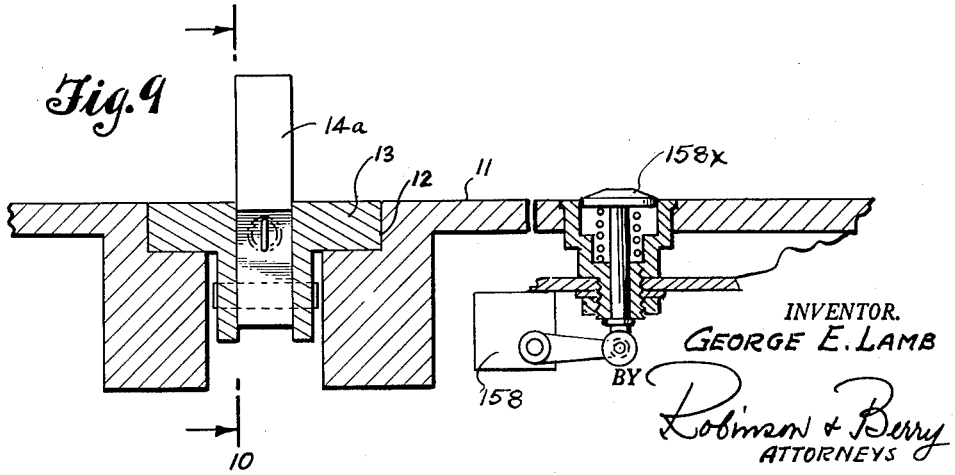

May 16, 1961  G. E. LAMB  2,984,364
ROLL-OVER MACHINE
Filed May 6, 1957  7 Sheets-Sheet 6

INVENTOR.
GEORGE E. LAMB
BY
Robinson & Berry
ATTORNEYS

United States Patent Office 2,984,364
Patented May 16, 1961

2,984,364
ROLL-OVER MACHINE

George E. Lamb, Hoquiam, Wash., assignor to Lamb-Grays Harbor Co., Inc., Hoquiam, Wash., a company of Washington Filed May 6, 1957, Ser. No. 657,269

7 Claims. (Cl. 214—1)

This invention relates to machines that are designed primarily for use in the pulp and paper manufacturing industry for the inverting of large and heavy stacks of paper or pulp sheets in the operation of applying wrappers thereto.

It is a practice in the commercial production of paper or pulp sheets, to cut the wide and continuous web of material, as formed, into strips of uniform width and to then divide the strips into pieces of uniform length. These pieces are laid down in stacks of a predesignated height; the stacks then being individually wrapped with heavy sheets of paper, or other suitable wrapping material, preparatory to their being shipped or stored. This stack wrapping operation, as previously carried out, has been difficult and time consuming, primarily because of the bulkiness and weight of the stacks and the fact that each stack had either to be turned over or lifted from its supporting surface in order that the wrapping material could be applied about it.

In view of the difficulties heretofore experienced in the handling of the stacks in the wrapping operation, it has been the primary object of the present invention to provide a machine whereby an individual stack, after having a wrapper sheet placed across its top surface can be held intact and inverted, thus to place the applied wrapper sheet beneath the stack, and then advanced with wrapper sheet so applied, onto a support or table for completion of the wrapping operation.

It is a further object of this invention to provide a machine of the above character, which I have designated as a "roll-over" machine, characterized by use of coacting clamping plates between which each stack, as advanced thereto can be clamped for the roll-over operation and then brought to the level of and advanced onto a conveyor table for easy movement to a place for the completing of the wrapping operation.

Another object of the invention is to provide a roll-over machine wherein conveyor tables are arranged at the same horizontal level for the conveyance of stacks into and from the machine, and wherein the complemental clamp plates, which open apart to receive a stack and then close, by equal movements, against the stack to hold it while inverted, alternately will be horizontally aligned with the conveyors so that the stacks can be advanced readily from one to the other.

Still another object resides in the use of air float conveyor means in the clamp plates and to provide for the automatic application of air to the plate onto which a stack is to be received incident to a stack being advanced onto the plate.

Still further objects of the present invention reside in the details of construction and in the combination of parts, and in the mode of operation of the machine, as will hereinafter be fully described.

In accomplishing the above mentioned and other objects of the invention, I have provided the improved details of construction, the preferred forms of which are illustrated in the accompanying drawings, wherein:

Fig. 1 is a top, or plan view of a roll-over machine and the associated stack weighing and conveying means embodied by the present invention.

Fig. 2 is a side elevation of the machine, showing a prepared stack, as positioned on the conveyor table at the receiving side of the machine with a wrapper sheet applied across its top surface, preparatory to the stack being advanced into the machine for inversion or roll-over.

Fig. 3 is an enlarged side elevation of the present roll-over machine. Fig. 3a is a sectional view of one of the equalizers applied to the clamp plate synchronizing chains.

Fig. 4 is a vertical cross-section of the machine taken on the line 4—4 in Fig. 3.

Fig. 8 is a vertical section, taken on line 8—8 in Fig. 2, showing the means for imparting controlled rotary motion to the roll-over machine.

Fig. 9 is an enlarged cross-sectional detail showing the mounting of one of the reciprocating feed bars in the conveyor table top.

Fig. 10 is a sectional detail, taken on the line 10—10 in Fig. 9, showing a feed bar control switch, and also the pivotal mounting of a stack advancing dog on the feed bar.

Figure 5:
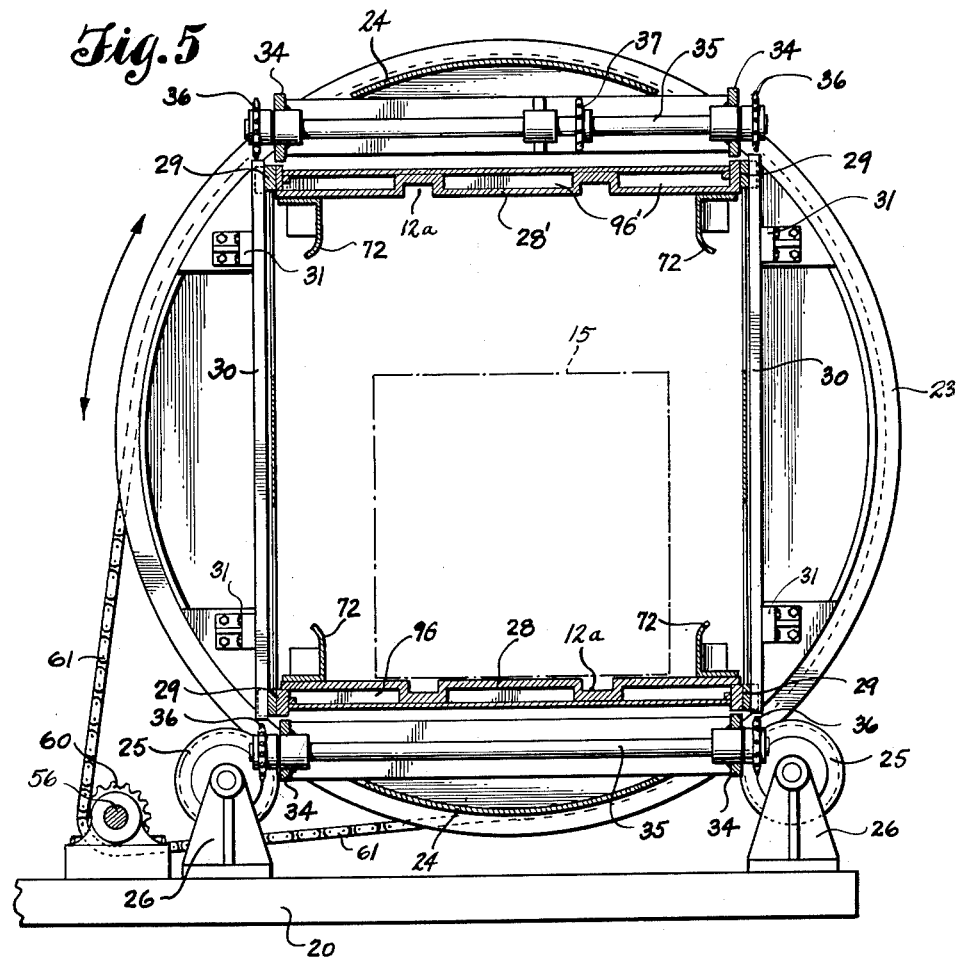
Fig. 5 is a vertical cross-section of the machine taken on line 5—5 in Fig. 3.

Briefly described, the present operation comprises the successive advancing of individual stacks of pulp or paper sheets from a conveyor table, where a wrapper sheet is manually placed over the top surface of the stack as illustrated in Fig. 2, onto a horizontal supporting clamp plate within the roll-over machine. With the reception of the stack in the machine, it is firmly clamped between the supporting and an upper clamping plate. The machine is then caused to turn on its horizontal axis through one-half rotation, thus inverting the stack. The clamp plates holding the stack then open apart, thus lowering the inverted stack to the level of an off-bearing conveyor onto which it is adapted to be advanced coincident with the advancing of the next stack into the machine. The inverted stack, with wrapper thus located beneath it may then be manually moved to a location for completing the wrapping operation.

The present invention is concerned primarily with the advancing of stacks in succession into the machine; the clamping of a stack as received for its inversion, then the rotation of the mechanism to effect inversion of the stack followed by the opening apart of the clamp plates and finally the simultaneous discharge of the stack with the insertion of a succeeding stack. While the machine has been described as for the handling of stacks of pulp or paper, it is readily apparent that it is equally applicable for the handling of other objects and materials and it is not to be confined in its use to stacks of sheet material.

Referring more in detail to the drawings:

In Figs 1 and 2, 10 designates a platform scale on which the stacks to be wrapped may be individually weighed before being wrapped. Adjacent the scale is a flat topped conveyor table 11 onto which each stack, after being weighed, is manually slid to a central position thereupon. At this point an attendant places a wrapper sheet over the top surface of the stack and the stack is then ready to start its automatically controlled journey through the roll-over machine.

The table top 11, as here shown, is formed from end to end, with parallel channels 12—12 in which feed bars 13—13 are reciprocally contained. Mounted in the feed bars, in paired, transverse alignment, is a first set and a second set of feed dogs, 14—14 and 14a—14a, whereby, with the reciprocal action of the bars, one stack is adapted to be advanced from the conveyor table 11 into the roll-over machine and the precedent stack is discharged from the machine to the off-bearing conveyor table 19. In Fig. 2 a stack to be wrapped, designated by numeral 15, is shown after being manually pushed from the scale onto the table 11, and a wrapper sheet 16 applied over the top surface thereof.

The present roll-over machine is designated in its entirety in Figs. 1 and 2, by reference numeral 18. At that end of the machine 18 opposite the table 11, is a conveyor table 19 onto which the stack, 15, after being inverted, will be advanced from the machine by the action of the feed bars 13 and their dogs 14a. It will further be noted, by reference to Fig. 2, that the platform scale 10, the table 11, and table 19 are at the same horizontal level for easy advancement of the stacks from one to the other. It is further to be explained that when the roll-over machine is in stack receiving position, the clamp plates contained therein will be opened apart and the lower plate will be located at the same level as the conveyor tables.

The roll-over machine 18 by which the invention is characterized comprises a horizontal base frame structure of rectangular form designated in its entirety by numeral 20. Supported on the base frame structure 20 in alignment with the conveyor tables, for rotative movement about a horizontal axis, is a rigid barrel-like frame structure which provides a passageway therethrough into one end of which the stacks 15 are received from the conveyor table 11 for inversion, and from the other end of which they are delivered after inversion onto the conveyor table 19. The rotary frame structure includes, at its opposite ends, paired track forming rings 22—23 of the same diameter; these rings being joined rigidly in spaced, parallel relationship by longitudinally directed arcuate plates 24—24, as noted in Figs. 1, 4 and 5. The rings 22 and 23, as observed in these views are coaxially aligned and are mounted for the axial rotation of the frame structure on rollers 25. These rollers are mounted for rotation by brackets 26 fixed on the base frame structure 20 at its four corners. It is noted in Fig. 3 that the rollers 25 located at the right hand end of the view are flanged at opposite edges and seat the ring 23 between the flanges thus to prevent any endwise shifting of the main frame structure on the base frame.

Mounted in the rotary frame structure, lengthwise thereof and in parallel planes above and below the axis of rotation, in reference to the showing in Figs. 4, 5 and 8, are complemental clamp plates 28 and 28'. These plates are adapted to be moved apart, as seen in Fig. 5, to admit therebetween a stack 15 from table 11, and then moved together to clamp and secure the stack therebetween for its inversion. After inversion of the stack, the plates may then be opened apart for advancement of the stack from the roll-over machine onto the conveyor table 19. The clamp plates 28—28', as well as also the off-bearing table 19, are provided with aligned tracks or grooves as at 12a and 12b for the reception of the feed bars 13 as they are advanced into and through the machine.

The clamp plates 28—28' are each equipped at opposite sides and adjacent opposite ends with guide blocks 29 adapted to follow guide rails 30 that are fixed in parallel relationship to opposite ends of the rotary frame structure by support brackets 31, as shown in Figs. 3 and 5.

To effect the opening and closing action of the clamp plates 28—28', I provide a pair of hydraulic cylinders 32 and 32' located at opposite sides of the machine, midway between its ends, as shown, for example, in Figs. 3 and 4. Each cylinder is fixed at its outer end, as at 33, to a longitudinal side flange 28f of one of the plates 28, and the piston rod 32r extended from each cylinder is fixed at its outer end, as at 33a in Fig. 3, to the corresponding longitudinal side flange of the other clamp plate 28'. With a stack 15 disposed upon the lower clamp plate 28, as indicated in Fig. 5, the application of hydraulic pressure medium to the upper ends of the cylinders 32 will cause the two clamp plates 28—28' to be moved toward each other, in unison, thus to clamp the stack between them and to hold it secure for inversion incident to a rotative movement of the clamp supporting frame structure. The application of hydraulic pressure to close the clamp plates 28—28' is controlled by a solenoid-operated valve 40 which is, in turn, controlled by a clamp relay 41 in Fig. 16. The clamp relay 41 is automatically controlled by other components in the electrical system as will be explained later.

In order that the coacting clamping plates 28—28' will be caused, both in their opening and closing actions, to move in unison from and toward each other, I have provided equalizing chain connections between them as in Figs. 1, 2 and 3 wherein its is shown that brackets 34 are fixed to the rotary frame structure, at its opposite ends in transverse alignment at upper and lower sides of the structure. Extended transversely of the frame structure, above and below the stack passage, and revolubly mounted at their ends in the brackets, are cross-shafts 35, each equipped at its opposite ends, as shown in Fig. 5, with sprocket wheels 36. Two of the shafts 35, for instance the two shown at the top in Fig. 3, are each equipped between its ends (see Fig. 5 also) with a sprocket wheel 37 and these are interconnected by a chain belt 38 which is extended about these wheels thus to cause these two particular cross-shafts 35 to rotate in unison. It is further shown in Fig. 3 that separate chain belts 39 are also applied about each of the vertical pairs of sprockets wheels 36, thus to complete the interconnection of all cross-shafts 35 for rotation in unison. Each of the oppositely moving runs of a chain belt 39 is secured to respective vertical pairs of guide blocks 29 of the oppositely moving clamp plates 28—28, thus to synchronize and equalize the oppositely directed movement of the clamp plates.

During any opening or closing movement of the clamp plates 28—28' they will move in unison to equal extent. When fully opened apart, the plates assume the vertically spaced relationship seen in Figs. 4 or 5. Their maximum extent of closing is indicated in dotted lines in Fig. 8.

In order that the clamp plates may automatically adjust themselves to accommodate themselves to stacks that may be of unequal height at opposite ends, I have incorporated yieldable connectors 38c in the chain belts 38 as has been shown in Fig. 3, these connectors being as shown in Fig. 3a.

To effect the opening and closing action of the clamp plates, a hydraulic pressure medium is applied to the opposite ends of the hydraulic cylinders 32—32 through flexible hose connections 45a—46a shown in Fig. 3, which are extended from supply lines 45 and 46 respectively. The lines 45a—46a lead, respectively, to fittings 47—48 supported from the head of that cylinder seen in Fig. 3. Pipe lines, designated by numeral 49 in Fig. 3, lead from fitting 47 to the lower end of the cylinders 32—32 at opposite sides of the machine, and the pipe line, designated by numeral 50, is connected to fitting 48 at the upper end of the cylinders 32—32. The lines 45a—46a are of sufficient clamp opening and closing operation.

The two supply lines 45 and 46 connect at what is designated as their discharge ends to a coupling block 54 that is fixed in a ring 55 of channel form that is applied about the rotary frame structure as noted in Figs. 3 and 8. The supply lines 45—46 are connected, respectively, to lines 45a and 46a through this block. The lines 45—46 depend from the block 54 as shown in Fig. 8 through an opening 56 in the supporting floor structure 57, for connection with pipe lines 58—58a. However, they are given sufficient slack to permit the turning of the structure through 180°. At their inner ends the lines 58—58a connect with the source of supply of pressure medium as indicated in Figs. 1 and 8 and the application of the pressure medium is automatically controlled in a manner to be described hereinafter.

Assuming that the clamp plates 28—28' of the machine are in the open relationship shown in Fig. 5, and that a stack 15 has been received between them, upon the lower clamp plate, as indicated in dotted lines. The feed bars 13 are retracted and the plates are then caused to be moved together and closed against the stack. Then the housing is rotated through an arc of 180° by the means which will now be described, reference being directed particularly to Figs. 1 and 8.

Figure 12:
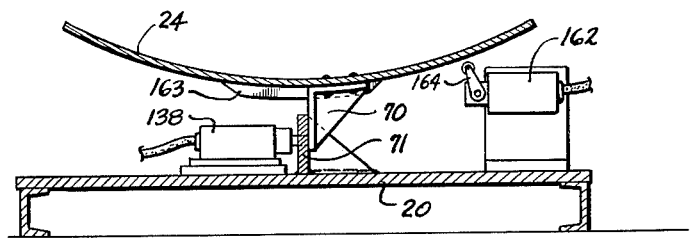
Fig. 12 is a vertical section taken on line 12—12 in Fig. 11.

Located at one side of the machine, parallel with its axis of rotation, is a shaft 52, rotatably supported near its opposite ends in bearings 51—51 fixed on the base 20. This shaft is adapted to be driven, selectively in opposite directions, by a reversible electric motor 53, through a reduction gear box 62 and a belt connection designated at 59. Fixed on opposite ends of the shaft 52 are sprocket wheels 60—60 about which chain belts 61—61 are extended. These belts are extended about opposite end portions of the rotary frame structure, being applied to flanges that extend from the rings 22 and 23; and fixed thereto at their ends by the belt tightening bolts 68 best shown in Fig. 3. Thus, by driving the shaft 52 in opposite directions, the roll-over structure 18 will be rotated about its axis in opposite directions. The rotary structure is limited in its extent of turning in opposite directions to 180° by the contacting of lugs 70—70' that are fixed thereon, with a stop flange 71 that is fixed to the base structure 20 so as noted in Figs. 3 and 12. In order to hold the roll-over structure 18 in fixed position after it reaches either limit of rotation an anti-roll brake 73, actuated by de-energization of a brake solenoid 74, is used to lock shaft 52 from rotation, to thus stabilize the clamping plates 28 for loading or unloading. The solenoid 74 is controlled automatically as will be explained later. When the turn over mechanism is at either limit of rotary movement with the clamp plates 28—28' fully opened apart, the lower of the plates will be located at the horizontal level of the receiving and discharge conveyors, as indicated by the showing in Fig. 3.

To aid in the proper reception and centering of stacks advanced from the table 11 onto the receiving clamp plates, both the plates are equipped along opposite sides with stack guide flanges 72—72, as noted in Fig. 4.

Figure 6:
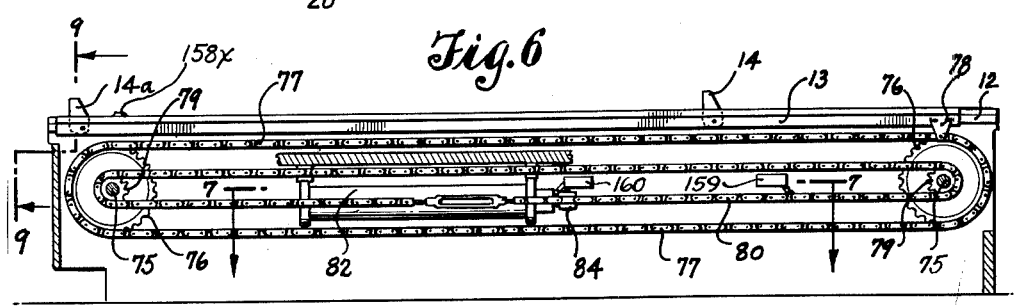
Fig. 6 is a longitudinal vertical section through the stack conveyor table at the receiving side of the machine, showing the connection of a stack feed bar with a chain belt whereby it is reciprocated.

Referring now to the stack conveying means: It has previously been explained that the stacks 15 are advanced by the reciprocal action of the bars 13—13 as best shown in Fig. 6 wherein it is noted that cross-shafts 75—75 are mounted horizontally in the opposite end portions of the table structure 11 and these are equipped in the vertical planes of the feed bars, with paired sprocket wheels 76 all of the same size, about which chain belts 77—77 are extended. Each feed bar 13 is equipped at one end with a depending lug 78 which is fixed to the corresponding chain belt 77. Thus, with travel of the chain belts, the feed bars will be moved accordingly. Likewise, the cross-shafts 75—75 are also equipped, at the insides of the sprocket wheels 76, with paired sprocket wheels 79—79, all of the same size, and of substantially lesser diameter than the sprocket wheels 76, about which chain belts 80—80 are extended.

Figure 7:
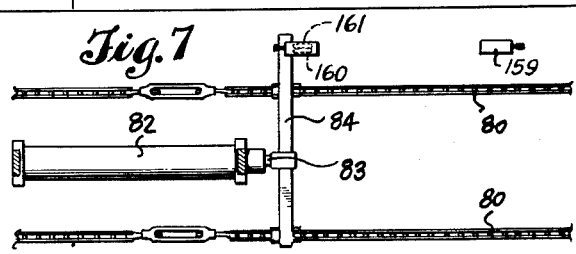
Fig. 7 is a horizontal section taken on line 7—7 in Fig. 6, showing the hydraulic cylinder for actuating the paired feed bar reciprocating chain belts.

Fixed horizontally in the base structure of the table 11, as seen in Figs. 6 and 7, is a hydraulic feed cylinder 82 with piston rod 83 extended therefrom and connected at its outer end, to a cross-bar 84 that is fixed to the chain belts 80—80. Thus, with the extending and retracting of the piston rod 83, the belts 80—80 will be moved accordingly, and through the sprockets 79—79 will cause the chain belts 77 to effect the increased reciprocal movements of the feed bars 13 that, on successive forward movements, will advance a stack 15 from the conveyor table 11 into the roll-over machine, while at the same time discharging a stack therefrom. During the subsequent retraction of the bars 13, the lugs 14 and 14a depress themselves automatically, as shown in phantom lines in Fig. 10, below the top surface of the bars 13 as they are withdrawn beneath the bottom of a stack. A spring 81 quickly erects the lugs as soon as they clear the stacks again.

Advancement of the stacks 15 across the table top 11 is facilitated by use therein of air discharge valves which are applied to the table and used in accordance with the teaching of U.S. Patent No. 2,315,627 issued on April 6, 1943. It is desirable also that the conveyor table top 19 likewise be equipped with air discharge valves in its top surface, designed to be actuated by the stacks in passing thereover, to support them for easy manual movement on a cushion of air under pressure, as taught by the U.S. patent above mentioned.

Figure 15:
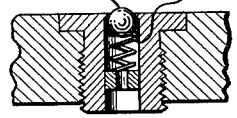
Fig. 15 is a sectional detail of a portion of one of the clamp plates, showing one of the air release valves set in the plate surface.

The two clamp plates 28—28', as employed in the present roll-over machine, also are equipped for the so called air-floating of the stacks received thereonto. For this purpose the plates are compartmented as shown in Figs. 4 and 5, providing air tight chambers 96—96'. Set in the flat stack engaging surfaces of these plates, at relatively close intervals, are the air release valves each comprising a ball shaped valve member 97, as in Fig. 15, set in an opening 98 against which the stack, as moved onto the plate will engage to open the valve, thus to admit air from the chambers 96 or 96' to the underside of the stack to form a stack lifting air cushion.

Figure 13:
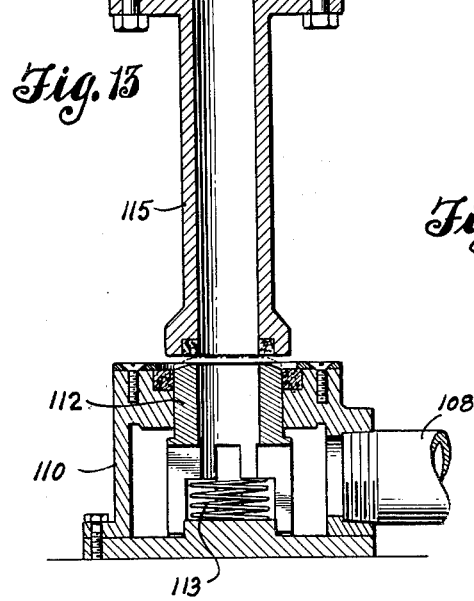
Fig. 13 is an enlarged sectional detail of an air pressure line connection provided between the conveyor clamp plate of the roll-over machine and the air line supply.

In order that air under pressure can be applied to the stack supporting clamp plate with the full opening of the plates for reception or discharge of a stack, an air line 108 is extended from an air pressure tank 109, as seen in Fig. 4, to an outlet box 110 that is mounted in the base structure 20 below the center of the stack supporting plate. This box, as shown in Fig. 13, has a discharge nozzle 112 directed upwardly therefrom, and yieldingly supported by a coiled spring 113 within the box. Mounted centrally of and on the outer side of the clamp plates 28—28' are outwardly directed tubes 115—115' which are in direct communication at their mounting ends with the air chambers 96—96' of their respective clamp plates. When either plate 28—28' is lowered to a stack receiving position as, for example, plate 28 in Fig. 4, the open lower end of its tube 115 is disposed in alignment with and receives the upper end of the nozzle 112 therein for an air tight connection. Air under pressure can then be admitted into the internal chamber of the lower plate from the pressure tank 109 under control of a solenoid valve 120 that is interposed in pipe line 108 as seen in Fig. 4. The solenoid valve 120 is itself automatically controlled by a feed contactor relay to be described in more detail hereinafter.

Figure 14:
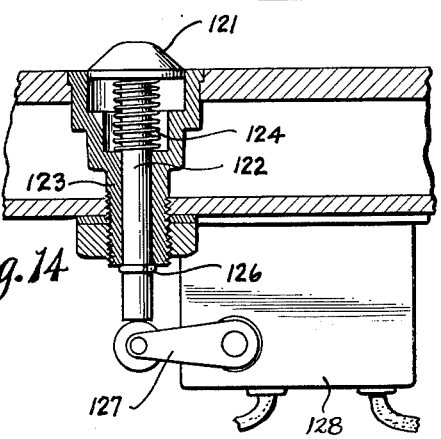
Fig. 14 is a sectional detail of one of the switch controls applied to a stack clamp plate.

The clamp plates 28—28' are also each provided with "twin" pairs of control switch buttons 121 or 121' which are used to "feel" the presence of a stack in contact with the respective clamp plates for the automatic control of the machine as will be described in detail later. These switch buttons 121—121' are each mounted on a vertical stem such as 122 to project slightly beyond the plate surface as seen in Fig. 14. The stem 122 is slidable in a bushing 123 set vertically in the plate and is urged upwardly to an upper limit of movement by a coiled spring 124 contained in the bushing and acting upwardly against the button. It is limited in its upward movement by a snap ring 126 applied about the lower end portion of the stem to engage the lower end of the bushing. The lower end of the pin extends below the bushing and plate to a position for its actuation of the control lever 127 of a switch 128 which is mounted on the outer side of the clamp plate. When a button such as 121 is depressed by contacting a stack, the stem 122 moves the switch lever 127 to actuate the switch 128 for control of certain phases of the automatic cycle.

Figure 16:
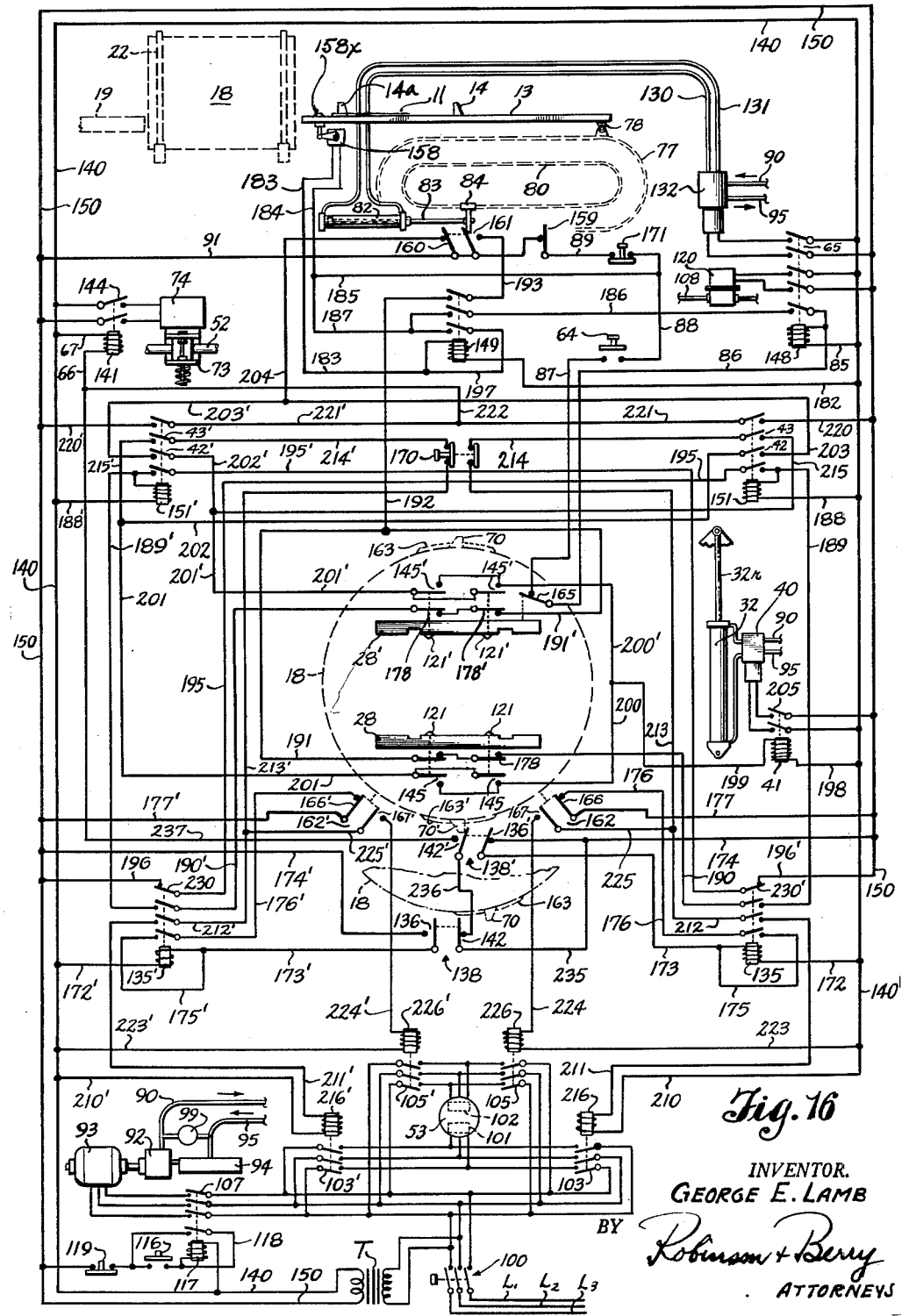
Fig. 16 is a diagram for the wiring of electrical controls of the machine and of the hydraulic system.

Application of a hydraulic pressure medium to the opposite ends of the hydraulic cylinder 82, Fig. 16, to effect the functional stack feeding operations of bars 13—13 is through pipe lines 130—131 leading to its opposite ends, under control of a valve mechanism 132. The hydraulic pressure medium is supplied to the valve 132 through a pipe line 90, leading from a pump 92, lower left Fig. 16, operated by a motor 93. The pump draws the hydraulic medium from a reservoir 94. This medium is returned from the cylinder 82 under control of the valve 132 through pipe line 95. A pressure relief valve 99 is interposed between the pipe line 90 and the pipe 95 to by-pass excess pump output.

The electrical circuitry as illustrated in Fig. 16 comprises a trio of electrical power supply lines $L_1$, $L_2$ and $L_3$ which provide relatively high voltage 3-phase current to a master switch 100 which, when closed, conducts the current to a plurality of motor contactors for running a reversible roll-over motor 53. The motor 53 is equipped with a highspeed-winding 101 and a slow speed winding 102. The high speed winding 101 is adapted to be actuated through either the highspeed-forward contactor 103 or a high speed-reverse contactor 103' as shown in the diagram. Similarly the slow speed winding 102 is adapted to be actuated through either the slow speed-forward contactor 105 or a slow speed-reverse contactor 105'. All these motor contactors are solenoid operated and are regulated by various combinations of relays and automatic switches as will be described in detail hereinafter.

A step-down transformer T is provided to reduce the high voltage current from two of the main power lines to a considerably lower voltage as required by control relays in the other parts of the electrical system. This low voltage is fed into the lines 140 and 150 at all times for distribution to the various parts of the electrical control system.

Still another high voltage motor contactor 107 is provided to supply high voltages current to the hydraulic pump motor 93. The motor contactor 107 is also solenoid operated and is actuated by momentarily pressing the motor starter button 116 to thus energize the solenoid 117 which is self-holding through the line 118, by virtue of the fact that current is received from the low voltage distribution lines 140 and 150. The numeral 119 denotes a stop button which is used to de-activate the solenoid 117 and thus stop the hydraulic motor 93.

A certain portion of the electrical circuitry of the invention is arranged in the form of duplicated or "twin" circuits which function alternately depending upon whether the machine is rolling 180° forward or rolling 180° backward to its point of beginning. This duplication is manifested by a certain amount of symmetry about a vertical centerline through the diagram of Fig. 16.

Corresponding "twin" parts are identified by numerals having primed counterparts (i.e., such as two stop relays 135 and 135' which will be described in detail later).

The above mentioned stop relays 135—135' which form a part of the circuitry of this invention are each alternately energized before the start of the respective forward and backward rotations of the rolls over machine 18. This is accomplished by the closing of contacts 136' or 136, respectively, of the double throw stop switches 138' and 138 when these switches are actuated by the lugs 70' or 70, as the case may be. The stop switches 138—138' are also each provided with a second set of contacts 142 and 142', respectively, which are connected in series and which are both closed during actual roll over (in either direction) thus to keep the brake valve relay solenoid 141 energized through lines 174, 235, 236, 237, 66 and 67 thus closing the brake relay contacts 144 and holding the brake 73 released so that rotation of both the shaft 52 and the roll over machine may take place. Conversely, as soon as the roll over is completed and one of the lugs 70 or 70' strikes its respective stop switch, one of the contacts 142 or 142' will be opened so that the brake solenoid 141 is de-energized and the brake 73 made to grasp and hold the shaft 52 from rotation.

The energizing of the stop relays 135 and 135' also plays a roll in the automatic functioning of the other relays as will be explained in detail later.

The roll over machine is also equipped with a pair of roll relays identified by their solenoid coils 151 and 151'. The energizing of one of these relays will start preparing the necessary live circuitry preliminary to the actual roll over operation. Although the roll relays, one or the other, become initially energized during a feed in operation (i.e., when the feed bars 13 are entering and inserting a stack), their ultimate objective is not completed until lines passing through relay contacts 42 and 43 (or 42' and 43') are permitted to be fully utilized for energizing a drive motor contactor (such as 103 or 103 for example) and this cannot take place until the plates 28—28 are both firmly clamped upon a stack 15 to close a pair of normally open contacts (such as 145') in the top plate 28 as will be explained in more detail later. Meanwhile energizing of a roll relay will act to close another circuit line for the functioning of the clamping operation, which must necessarily be completed first.

In addition to the necessity of having one of the roll relays (151 or 151') activated, the functioning of the clamps cylinders 32, by the energizing of the clamp relay 41, is possible only when there is a stack resting on the bottom plate (such as 28) in such a manner as to close one of a pair of normally open, parallel connected contacts, such as 145 in the said bottom plate, and the feed bar 13 is retracted so as to close a normally open "feed-withdrawn" switch contact 160. This will provide a complete closed live circuit for energizing the clamp relay 41 and starting the clamping operation as will be explained in more detail hereinafter.

The automatic control system of this invention utilizes two additional relays, i.e., 148 and 149, one of which (i.e. 148) is called a feed relay. The feed relay 148 must each time be manually energized and this is done by an attendant who momentarily presses a convenient feed button 64 as soon as he has arranged a stack 15 upon the center of the conveyor table 11 (complete with overlying wrapper 16 as shown in Fig. 2) and the stack is ready to enter the roll over machine. The energizing of the feed relay 148 immediately causes the advancement of the feed bars 13 and causes air to be supplied to the interior chamber of the bottom plate as explained earlier, thus to facilitate the sliding of the heavy stacks as they are being fed into place inside the machine. The other relay 149 is called the entering relay and it becomes energized after the bale starts to enter the roll over machine. In conjunction with the parts just mentioned a button operated switch 158 is located in the air float roll over machine feed plate just forwardly of the feed dog 14a as shown in Fig. 6. This switch and its operating mechanism is exactly like that shown in Fig. 14 and previously described. This switch is shown in conjunction with Fig. 9 and it comprises the switch mechanism designated generally by reference numeral 158, and the operating button 158x which projects above the top surface of the feed plate as shown.

In operation, the roll over machine feed is often jogged by the operator momentarily depressing the feed button 64, thus energizing relay solenoid 148, actuating the solenoid controlled feed valve 132, causing the feed bar to advance as required, for example, to advance two stacks of a two stack bale together before the reinforcing sheets are laid in place thereon. The switch 158 will remain open until these assembled stacks start to enter the roll over machine. As soon as the push button 64 is released, the solenoid 148 is deactivated and the valve 132 returns to its normal position, allowing the feed bar to return to its normal full retracted position. However, when the bale does start to enter the roll over machine, it engages switch button 158x and this actuates switch 158 and causes current to flow through the circuit, energizing solenoid 149 which maintains the circuit, energizing solenoid 148 until the feedstroke is completed.

The roll over machine is also provided with a pair of slow speed switches 162 and 162' which are mounted on the base 20 thereof and which are actuated by a pair of cams 163 and 173', respectively, which are fixed to the opposed arcuate plates 24 of the outer peripheral structure of the roll over machine 18.

Figure 11:
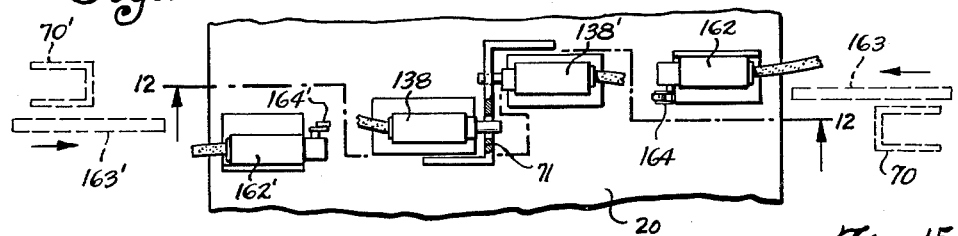
Fig. 11 is a fragmentary plan view taken as indicated by arrows 11—11 in Fig. 3, of a portion of the base of the roll-over machine, showing certain electrical switches and stops mounted thereon.

As the roll over machine starts to approach the end of a 180° roll, it becomes necessary to first slow down the rate of roll and then to finally cut off the roll driving power entirely and let the machine coast to an easy stop. It is for this reason that the cams 163—163' are provided. On their downward journey they will actuate the respective lever arms 164—164' of Figs. 11 and 12, of the slow speed switches 162—162' and cause these dual contact switches to in effect cut off the high speed current to the roll driving motor 53 and simultaneously start the slow speed current as will be described in more detail later. Then as the cams 163 or 163' pass and release the lever arms 164 or 164' the slow speed current also ceases to the motor 53 and it coasts to a stop the exact stop limit being determined by the stop lugs 70 or 70' striking the stop flange 71, as well as also actuating the switches 138 or 138' to set the brake 73 as previously explained. Although the cams 163 or 163' travel forth and back down and up again past the respective switches 162 and 162' during the operation of the machine, only the forward or downward motion has any effect upon the switches 162—162'.

It will be noted in Fig. 4 that one of the arcuate plates 24 forming part of the frame of the roll over machine has affixed thereto a so-called "clamp plate open" switch 165 which is adapted to be actuated (i.e. closed) by the clamp plate 28' when the plate opens to maximum extent and strikes the actuating lever 166 of the switch. This switch 165 is also shown schematically in Fig. 16 where the clamp plates 28—28' are shown fully open and empty.

Finally, to complete the description of parts of this invention, the circuitry of Fig. 16 includes some supplementary switches which are not ordinarily utilized during normal operation and are provided merely for emergency use or some other interruption of normal operation. The first is a roll over stop button 170 with which the current to the motor contactors may be broken and thus stop the rotation of the machine if so required by some unusual condition. The second switch is a feed stop switch 171 with which the current to the entering relay 149 may be broken thus to de-energize the feed relay 148 and stop the advance of the feed bars 13.

The operation of the roll over machine from the electro mechanical standpoint as exemplified by the diagram of Fig. 16 is as follows:

First of all, the master switch 100 must be closed so that continuous current is provided through the transformer T to the main distribution lines 140 and 150. Likewise current is made available to motor contactors such as 103, 105, 107, etc., so that as the latter become individually energized, suitable operating current is supplied to their respective motors 53 and 93. The hydraulic pump motor 93 must be started and left continuously running preparatory to the actual start of operation of the roll over machine. As explained earlier, this is accomplished by momentarily pressing the starter button 116 to energize the self-holding solenoid 117 which closes the contacts 107 leading to the motor 93.

For the purposes of this description it will be assumed that, before the actual start of operations, the roll over machine is in one of two natural rest positions. Such a position is illustrated in Fig. 16, where the stop lug 70' (instead of the lug 70) happens to be at the extreme underside of the machine. Also the clamp plates 28—28' are fully opened apart and ready to admit a stack therebetween.

With the machine in the above described electrically alerted position of rest, but waiting to be actually loaded for the first time, the only live circuit in the entire control system will be the stop relay circuit as identified by the lines 172, 173 and 174. However, this stop relay circuit is supplemented by a sustaining circuit 172, 175, 176 and 177 which later takes over all responsibility for maintaining relay 135 as soon as switch contacts 136 are released by actual start of clockwise (forward) roll motion.

As soon as the attendant has a stack on the conveyor table 11 ready for insertion into the machine, he will momentarily push the feed button 64 and this will establish a closed circuit through the lines 85, 86, 87, 88, 89 and 91 to energize the feed relay solenoid 148. This causes the closing of contacts 65 to thus actuate the solenoid controlled feed valve 132. Hydraulic fluid is thus introduced to the line 131 to cause the forward movement of the feed bars 13 as previously described. Meanwhile, the air line valve 120 was also actuated by the energizing of solenoid 148 so that air is supplied through pipe 108 to the chamber 96 in the lower plate 28 as previously described.

At some time during the feed in operation the roll solenoid 151 will become energized. If, as at the very start, there is no stack within the roll over machine 18, the contacts 178 of the switch buttons 121 will be normally closed so that as soon as the feed operation commences and the cross bar 84 releases (i.e. closes) the switch 161, the roll relay 151 energizes almost instantly after the entering relay 149 is energized because a path for current is provided through the lines 188, 189, 190, 191, 192, 193 and 91. However, it is usually the case that a stack is already in the machine when a following stack is ready to be admitted. In this case, the roll relay 151 will be delayed in energizing until approximately the middle of the forward stroke of the feed bar 13. This is because at this time, one stack is half way out of the machine and the other stack is half way into the machine, and neither strike the switch buttons 121, so electrically speaking the plate 28 is empty for a moment. The roll relay 151 is thus energized through lines 189, 190, 191, etc., for only a brief period of time, after which it sustains itself through the lines 188, 195, 196, which it would do in any event.

The feed mechanism continues to advance until it reaches its maximum forward stroke at which time the so called "feed out" switch 159 is automatically opened by the advance of the cross bar 84. This immediately causes the interruption of current to the entering relay solenoid 149 as well as the feed relay 148 and both become dead. With the de-energizing of the feed relay 148, the contacts 65 reopen thus reversing the valve 132, and the feed mechanism immediately starts to retract the feed bars 13 for withdrawal from the machine.

With a stack deposited within the machine and the feed mechanism now fully retracted, the switch 160 is automatically caused to close and current then flows through the lines 198, 199, 200, 201, 202, 203, 204 and 91 to energize the clamp relay 41 which closes contacts 205, actuates the solenoid valve 40 and causes the clamping operation to begin.

As soon as the clamp plates 28—28' have been moved together to clamp the stack 15 firmly therebetween, the upper switch buttons 121—121' are engaged and this causes the closing of contacts 145'—145'. A new circuit is thereby provided, through the lines 210, 211, 212, 213, 214, 215, 201', 200', 200, 201, 202, 203, 204 and 91, which energizes the solenoid 216 of the high speed forward contactor. This starts the roll-over drive motor 53 running at full speed to rotate the roll-over machine 18 in a forward or clockwise direction as viewed in Fig. 16. It should now be pointed out that earlier, during the energizing of the roll relay 151, current was caused to flow through the lines 220, 221, 222, 66 and 67 to activate brake relay 141 and release the brake 73, preparatory to start of the actual roll-over operation.

The roll-over motor 53 will now run at high speed forwardly to rotate the machine clockwise approximately 155° at which time the cam 163 will be swung down to engage the slow speed forward switch 162 and cause the opening of its contacts 166 to break the current for sustaining the stop relay 135 thereby de-energizing it and causing the interruption of current through lines 210, 211 and 212. This will, of course, de-energize the solenoid 216 of the motor contactor 103 and cut off the current which caused high speed forward roll. Simultaneously, the contacts 167 will become closed by the action of the elongated cam 163 and current will flow through the lines 223, 224, 225, 213, 214, 215, 201', 200', 200, 201, 202, 203, 204 and 91 to energize the solenoid 226 of the slow speed forward contactor 105 and thus drive the motor 53 at slow forward speed during most of the remainder of the machine's 180° roll. Finally, however, the cam 163 completely passes and releases the switch 162, thus re-opening contacts 167 and causing even the current for slow speed operation to cease. Thereafter, the machine coasts to a stop with the lug 70 coming to rest against a stop flange 71, see Fig. 12, and also actuating the switch 138 to open the contacts 142 thereof, Fig. 16, and cause the brake 73 to become set as explained earlier.

At this time, when the switch 138 is actuated, the contacts 136 become closed so that current passes through the lines 172', 173' and 174' to energize the twin stop relay 135'. This will cause the opening of the normally closed contacts 230 so that the current flowing through the lines 188, 195, and 196 will be interrupted and the roll relay 151 becomes dead. This causes the opening of contacts 42 which in turn causes the clamp relay 41 to become de-energized since current can no longer flow through the lines 198, 199, 200, 201, 202, 203, 204 and 91. Consequently the clamp plates 28—28' are re-opened and the inverted stack 15 now rests on the plate 28' with the wrapper sheet 16 beneath the stack instead of above it as before. The first half of the machine's operating cycle is now completed, having inverted one stack. The second half of the roll-over machine's cycle discharges the first stack and subsequently accomplishes the inversion of a second stack. It is during this second half of the machine cycle that the roll-over machine reverses itself as a result of the automatic control of the "twin" portion of the electrical circuitry. The reversing cycle is identically similar to the forward cycle described in detail hereinbefore and will not be further described.

What I claim as new is:

1. A roll-over machine comprising in combination, a roll-over frame of barrel-like form supported for rotation about a horizontal axis, a feed table across which bales may be advanced into the roll-over machine; said roll-over machine comprising complemental clamp plates mounted in parallel relationship above and below the axis of rotation of said roll-over frame to receive a bale between them for inversion, means for actuating said clamp plates equally toward the axis of rotation to clamp a bale advanced between them for inversion, and for opening the plates apart to release the bale after the inversion of the bale, and power means for rotating the roll-over frame through one-half turn to invert a bale as clamped therein; each of said clamp plates having an air chamber therein and each being equipped with means for the supplying of air under pressure thereinto when in position to receive a bale thereinto, and each being equipped in its clamping surface with normally closed air discharge valves adapted to be opened by the weight of a bale resting thereon, to discharge air to the underside of the bale as an aid in its conveyance on said plate.

2. The machine of claim 1 wherein the bale clamping plates are actuated to their bale clamping positions by yieldable means whereby said plates are permitted to angularly adjust themselves in accordance with bales of unequal heights at their opposite ends.

3. A roll-over machine as in claim 1 including means for lowering the lower clamp plate into horizontal alignment with the surfaces of said table after inversion of the bale.

4. A roll-over machine as in claim 1 wherein the means for actuating the clamp plates for a clamping operation comprises electrical circuitry including a switch carried on the lower of the clamp plates and operable incident to the disposition of a bale in clamping position on said plate to effect the energization of the clamping means.

5. A roll-over machine as in claim 1 wherein said power means for rotating the roll-over frame is electrically controlled and its circuitry includes feeler switches mounted by the clamp plates in position for their actuation by the clamping of a bale between said plates to energize the rotating means.

6. A roll-over machine as in claim 5 wherein said circuitry also includes switches operable by means on the rotating roll-over frame as it reaches a stopping position for de-energizing the said rotating means.

7. A roll-over machine comprising a roll-over frame mounted for rotation on a horizontal axis, a reversible electric motor for rotating said frame, complemental clamp plates mounted horizontally in said frame, symmetrically spaced above and below its axial line, electrically energized means for actuating the clamp plates toward each other to clamp a bale between them for its inversion and from each other to release the inverted bale, control switches for said electric motor and said electrically energized means mounted in said clamp plates, the control switch in the lower plate being operable incident to a bale being received thereon to energize the electrically energized means for actuating said clamp plates against the bale, and the control switches mounted in both plates being operable conjointly to energize the reversible motor to effect a roll-over operation.

References Cited in the file of this patent

UNITED STATES PATENTS

| 1,783,814 | Schroeder et al. | Dec. 20, 1930 |
| 1,859,501 | Durbin | May 24, 1932 |
| 2,293,192 | Campbell | Aug. 18, 1942 |
| 2,315,627 | Lamb | Apr. 6, 1943 |
| 2,520,252 | Mutchler | Aug. 29, 1950 |

(Other references on following page)

UNITED STATES PATENTS

| | | | |
|---|---|---|---|
| 2,557,395 | Schmidgal | June 19, 1951 |
| 2,651,087 | Fellows | Sept. 8, 1953 |
| 2,665,128 | Guffey | Jan. 5, 1954 |
| 2,666,534 | Pietsch | Jan. 19, 1954 |
| 2,718,321 | Westmeyer | Sept. 20, 1955 |
| 2,772,766 | Kellam | Dec. 4, 1956 |
| 2,774,487 | Rounsefell et al. | Dec. 18, 1956 |
| 2,865,516 | Hedderich | Dec. 23, 1958 |
| 2,865,517 | Alford | Dec. 23, 1958 |